US00RE35006E

United States Patent [19]

Ripley, Sr. et al.

[11] E Patent Number: Re. 35,006

[45] Reissued Date of Patent: Aug. 1, 1995

[54] TURFING SYSTEMS FOR STADIA

[75] Inventors: Thomas L. Ripley, Sr., Chalfont, Pa.; Henry Indyk, Sommerset, N.J.

[73] Assignee: The Greenway Services, Inc., Horsham, Pa.

[21] Appl. No.: 131,531

[22] Filed: Oct. 4, 1993

Related U.S. Patent Documents

Reissue of:

[64] Patent No.: 5,187,894
Issued: Feb. 23, 1993
Appl. No.: 594,355
Filed: Oct. 9, 1990

[51] Int. Cl.[6] ..... A01G 9/02

[52] U.S. Cl. ..... 47/66; 47/86; 47/59

[58] Field of Search ..... 47/1 F, 66 S, 66 SC, 47/86, 59 CD

[56] References Cited

U.S. PATENT DOCUMENTS

| | | | |
|---|---|---|---|
| 3,872,621 | 3/1975 | Greenbaum . | |
| 3,975,869 | 8/1976 | Bouton . | |
| 4,058,930 | 11/1977 | Miles | 47/665 |
| 4,067,716 | 1/1978 | Sterrett | 71/24 |
| 4,111,585 | 9/1978 | Mascaro . | |
| 4,118,892 | 10/1978 | Nakamura . | |
| 4,216,615 | 8/1980 | Soderberg et al. . | |
| 4,352,256 | 10/1982 | Kranz . | |
| 4,688,357 | 8/1987 | Deaton . | |
| 4,837,971 | 6/1989 | Visser . | |
| 4,907,793 | 3/1990 | Wund . | |
| 4,926,586 | 5/1990 | Nagamatsu . | |

FOREIGN PATENT DOCUMENTS

| | | | |
|---|---|---|---|
| 2639565 | 9/1978 | Germany | 47/66 SC |
| 6047121 | 3/1985 | Japan | 47/1 F |
| 1426425 | 2/1976 | United Kingdom | 47/1 F |
| 2138690 | 10/1984 | United Kingdom . | |

*Primary Examiner*—Henry E. Raduazo
*Attorney, Agent, or Firm*—Woodcock, Washburn, Kurtz, Mackiewicz & Norris

[57] ABSTRACT

Stadia and other activity surfaces are provided comprising natural turf. Natural turf units are provided which are transportable between first and second locations, the second location being for the growth and maintenance of the turf unit; the first location being a location for the performance of the desired activity. Means of transporting the units between the first and second locations are also provided. Artificial plant growth media are also provided comprising sand fractions and at least about 30% of shaped pieces of expandable polymer which are substantially inert to plant growth chemistry. In accordance with preferred embodiments, domed stadia are provided with natural turf activity surfaces which are able to withstand intensive wear during multi-season activities.

4 Claims, 4 Drawing Sheets

TURFING SYSTEMS FOR STADIA

Matter enclosed in heavy brackets [ ] appears in the original patent but forms no part of this reissue specification; matter printed in italics indicates the additions made by reissue.

BACKGROUND OF THE INVENTION

This invention is directed to the provision of natural turf surfaces in environments generally unsuited to the continued maintenance and growth of turf. One such environment is that present by a stadium, especially a stadium employed for multiple uses. As is widely appreciated, such stadia may be used both for football and baseball activities as well as for concerts, conventions and the like. This degree of usage presents such stress upon growing turf plants as to render the effective maintenance of natural turf surfaces under these conditions nearly impossible. The difficulties are exacerbated when a stadium is covered with a dome since the conditions obtaining within domed stadia are even more hostile to turf plants.

This invention is also directed to new, light weight growing media for the growth of plants, especially turf plants, and to methods for their employment.

While a number of workers have approached the design of improved stadium facilities for multiple uses and while a number of horticulturists have used varying means of transport for plant material within greenhouses, no effective means of providing well-groomed natural turf surfaces in stadia and playing fields has been known heretofore.

For example, U.S. Pat. No. 3,975,869 in the name of Bouton discloses a sports complex having movable seating units so as to configure the complex for varying activities such as football and baseball. U.S. Pat. No. 4,216,615—Soderberg et. al.—discloses a hothouse having moving beds for the cultivation of plants. U.S. Pat. No. 4,352,256 in the name of Kranz provides a greenhouse structure having a plurality of "spoke" units and a movable, central hub, plants growing within the spokes being transferrable into the hub region. U.S. Pat. No. 4,688,357—Deaton—is directed to configurable stadia with movable stands. The ability to provide differing contours over differently shaped surface areas is also provided including the moving of sections of playing field.

U.S. Pat. No. 4,837,971—Visser—is directed to greenhouses wherein plants can be moved from treatment to growing areas. U.S. Pat. No. 4,907,793 discloses an arrangement allowing varied use of a natural turf surface by covering the grass surface with supporting structure which is equipped with light source. While the covered surface is used, the underlying natural turf can continue photo-biological growth processes.

None of the foregoing provide natural turf surfaces for stadia, playing fields or the like suitable for the continued growth and maintenance of the turf in good condition.

OBJECTS OF THE INVENTION

It is an object of this invention to provide well groomed, natural turf surfaces in stadia, other structures and playing fields where turf is subject to hard use and abuse.

A further object is to provide transportable turf units for use in the provision of turf surfaces in stadia and the like.

Another object of this invention is to improve domed and other stadia through the incorporation of a turf growing location, remote from the location where stadium activities take place, together with means for nurturing turf at the growing location while providing the turf at the activities location when such activities are under way.

A further object is to provide light weight growing media for plants, especially turf plants.

These and other objectives will become apparent from a review of the instant specification and attendant claims.

SUMMARY OF THE INVENTION

In accordance with this invention stadia are provided for the performance of activities having first and second locations. The first location is for the performance of the activities while the second location is different from the first location and is designed to have controllable conditions for the growth and maintenance of natural turf. One or more natural turf units are also provided which are transportable between the locations. In this way, the turf can be nurtured under conditions selected to be optimum for the turf while the turf, when needed for use, can be transported to the use location.

In accordance with other embodiments, a plurality of turf units are employed which may be transported either together or individually. The units may be arranged in a plurality of geometries such that areas of wear can be rotated among the units to minimize stress upon individual turf units.

A large number of means for transporting the turf units may be employed including flanged wheel and rail systems, roller arrangements, sliding arrangements, conveyor systems or ordinary wheel sets placed upon or under the turf units. Motive force such as a tractor, a traction motor, winches or the like are also, preferably, provided.

It is preferred that the turf units contain a plant growing medium and substantially entire turf plants. Thus, while sod may be used, it is preferred that entire, fully growing and functioning plants be grown and employed. Artificial soils having relatively light weights are preferred for such use and are provided as one embodiment of the invention.

It is preferred that the plant growing media comprise at least about 40% of a sand fraction containing sand and preferably humus, clay and silt together with essential nutrients and minerals for turfgrass growth together with at least about 30% of shaped pieces of expanded polymer. The expanded polymer is selected to be substantially inert with respect to plant growth chemistry and to have an extremely light specific gravity.

It is also preferred to provide transportable, natural turf activity surfaces comprising a plurality of turf units which are transportable. Such units preferably comprise growing pans adapted for containing plant growing media together with growing, substantially entire turf plants. The units are preferably designed to cooperate with each other to facilitate the elaboration of substantially continuous turf surfaces for athletics or the like.

DETAILED DESCRIPTION OF PREFERRED EMBODIMENTS

It has been determined that the maintenance of natural turf in stadia such as a domed stadium cannot be accomplished in conventional ways as to permit the intensive use of the stadium. Thus, while it is possible to maintain natural turf surfaces in stadia used for only a portion of the year such as a football, soccer, or baseball stadium, the hard use accompanying the integration of a plurality of sports or other events into a single stadium is essentially incompatible with the maintenance of natural turf. Notwithstanding this, natural turf surfaces have a multitude of advantages which are appreciated both by the spectators and those individuals whose activities take place upon the turf, especially under a dome. Thus, athletes prefer natural turf surfaces to artificial ones observing a relatively smaller number of injuries taking place on natural surfaces and improvements in playability.

In accordance with the present invention, it is now possible to install natural turf surfaces in domed and other stadia, including stadia for multiple purposes, playing fields, gardens, terraces, building areas and the like while maintaining excellent quality of turf over extended seasons.

This is done by growing turf units in a growing location preferably adjacent to, but in all cases separate from, the location within a stadium or other activities location where the performance of activities takes place. The turf units are grown and nurtured within this second location under conditions adapted particularly for their growing requirements. Such a location may conveniently be considered analogous to a green house specially adapted for the growth and maintenance of turf. The turf unit or units are able to benefit from the particularized conditions optimum for their development for the maximum period of time prior to being exposed to activity conditions. Additionally, varying turf unit or units may be substituted in order to maintain the actual playing or activity surface in optimum condition.

Figure 1:
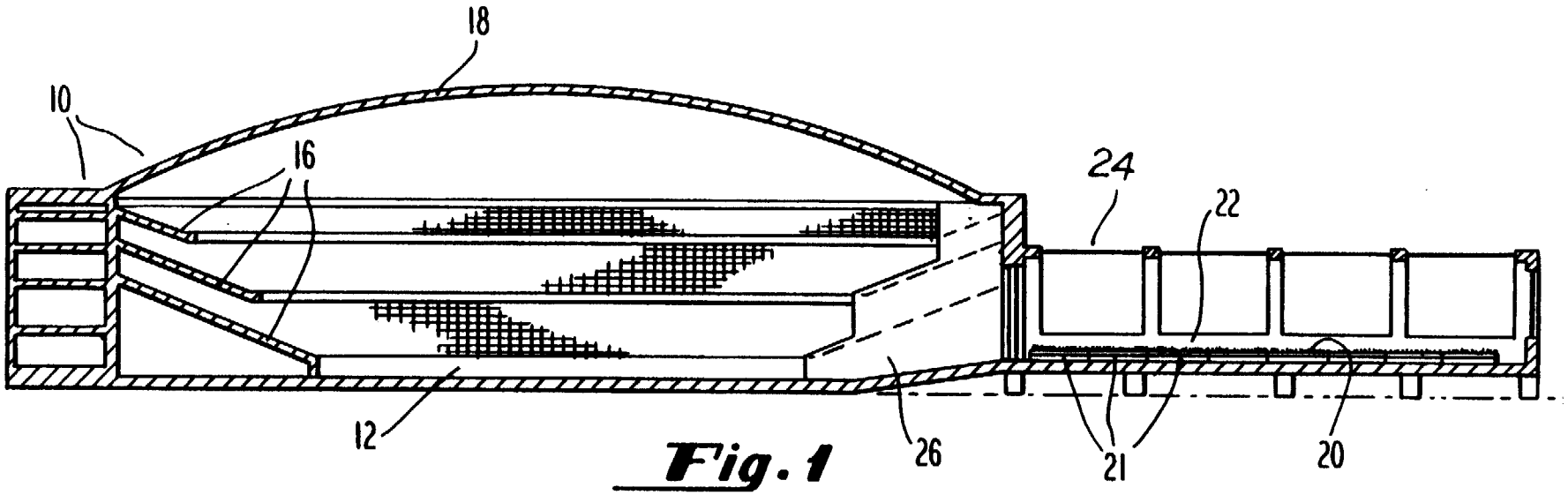
FIGS. 1 and 2 depict a stadium in accordance with the invention.

FIG. 1 depicts a domed stadium 10, in accordance with the invention having a green house area adjacent thereto. The stadium comprises a first location for the performance of activities, 12 together with a variety of stands 16 and a covering or dome 18. The adjacent green house area comprises a second location which is designed for the optimum growing of turfgrasses, 22 together with an optional but preferred cover 24 and turf, 20 comprising, in a preferred embodiment, a plurality of turf units 21. Access 26 is provided between the first and second locations 12 and 22 respectively so as to permit the transportation of turf 20 or its constituent turf units 21 there between.

Figure 2:
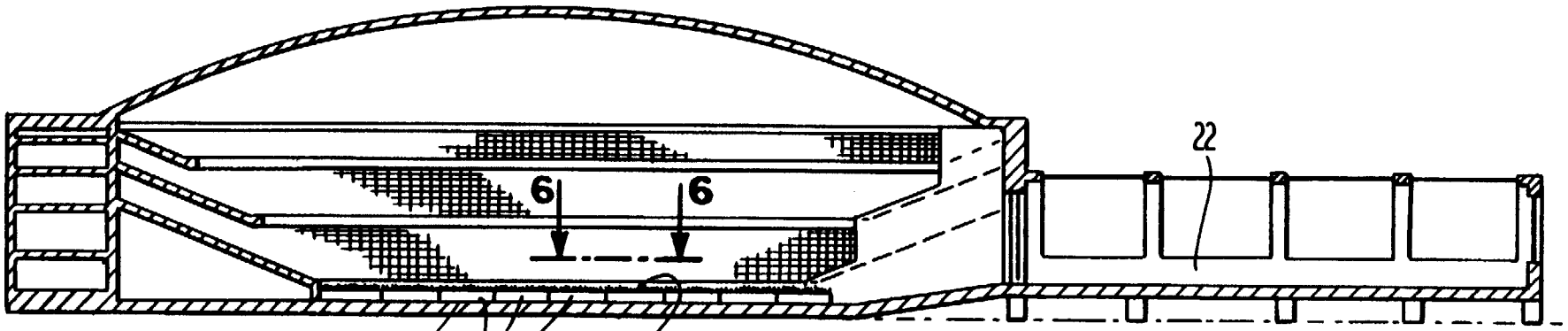

FIG. 2 depicts the stadium of FIG. 1 having the turf 20 comprising the plurality of turf units 21 in place in the activity location, first location 12.

Figure 3:
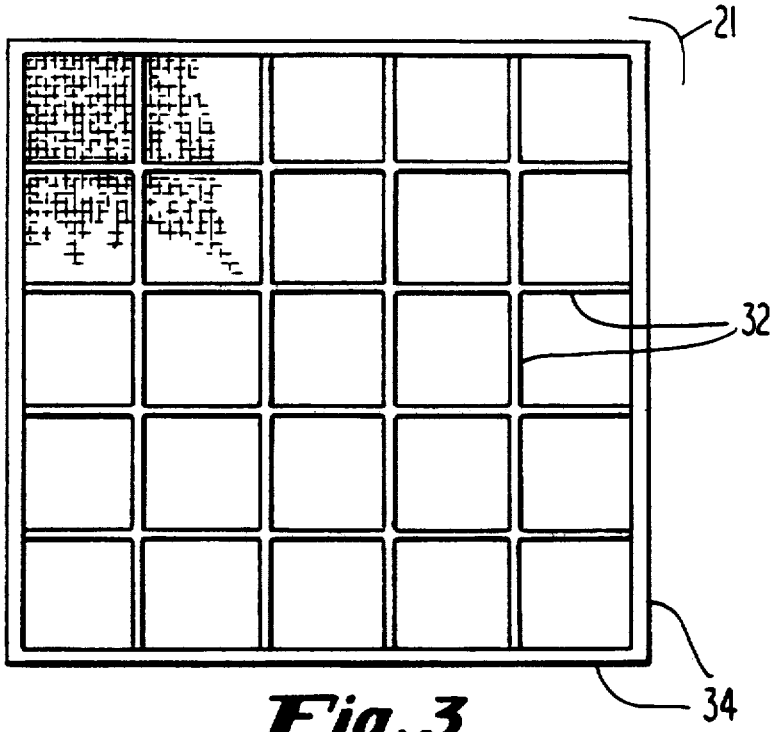
FIGS. 3 and 4 disclose turf units in accordance with the invention in the form of a growing pan.

FIG. 3 is a plan view of a turf unit 21 which may be a preferred growing pan. Other forms of turf unit may be employed in accordance with this invention having different geometries and the like. The turf unit 21 as depicted in FIG. 3 comprises enclosing sides surmounted by removable crown pieces 34 as will be discussed more fully hereinafter. A battling arrangement comprising baffles 32, here shown in a rectilinear geometry, are also preferably provided.

Figure 4:
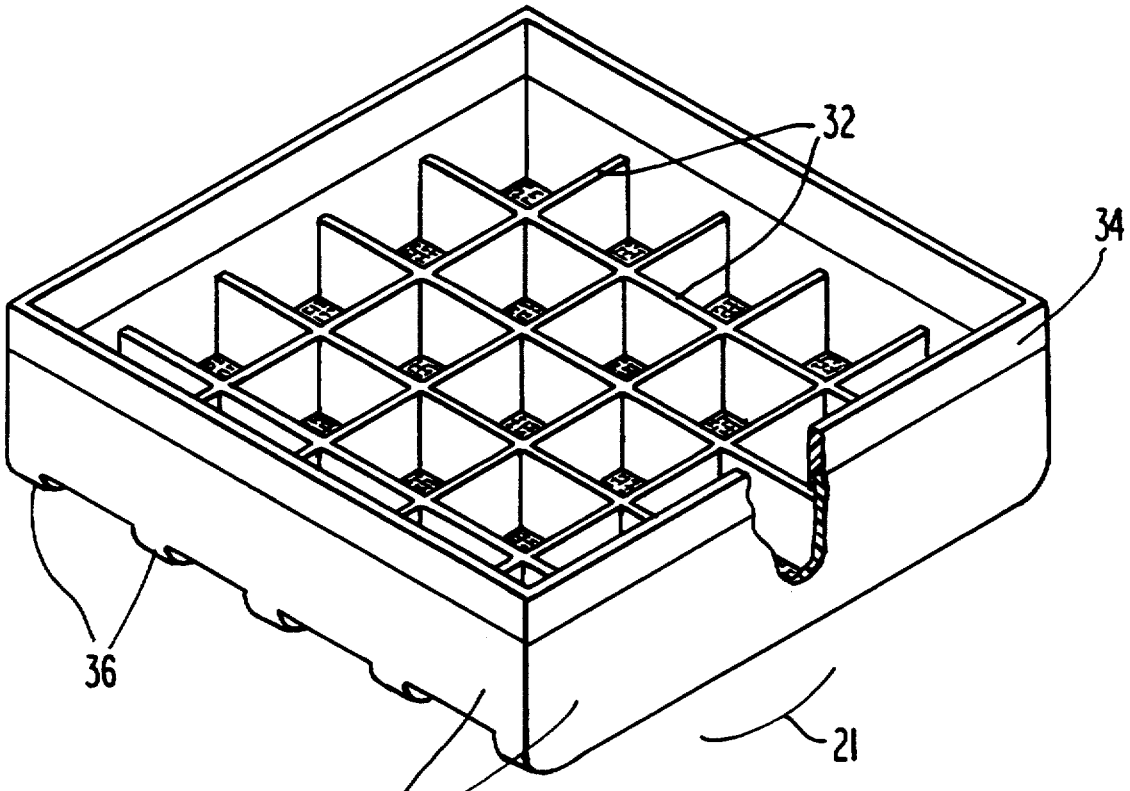

FIG. 4 depicts in perspective a turf unit in accordance with FIG. 3. The arrangement of the crown pieces 34 to the sides 30 which they surmount is set forth. As can be seen, the crown pieces follow the path of the sides 30 and are preferably configured to securely interlock therewith. The crown piece or pieces are removable from the sides. For certain applications, especially where large-dimensioned turf units are employed, it may be preferred to have a plurality of pieces forming the crown 34. Thus, the crown may be formed of such pieces which are fastened together at the corners or otherwise with interlocking fingers, with used hinges and pins, or any other convenient arrangement. The baffling arrangement comprising baffles 32 is more fully depicted. As will be appreciated, the baffles serve to impede the fluid flow of growing medium which will be caused to fill the turf unit. Also, preferably provided are stretchers 36 which serve both to raise the turf unit from an underlying surface to permit water drainage and also to provide assistance in the transportation of the units.

Figure 5:
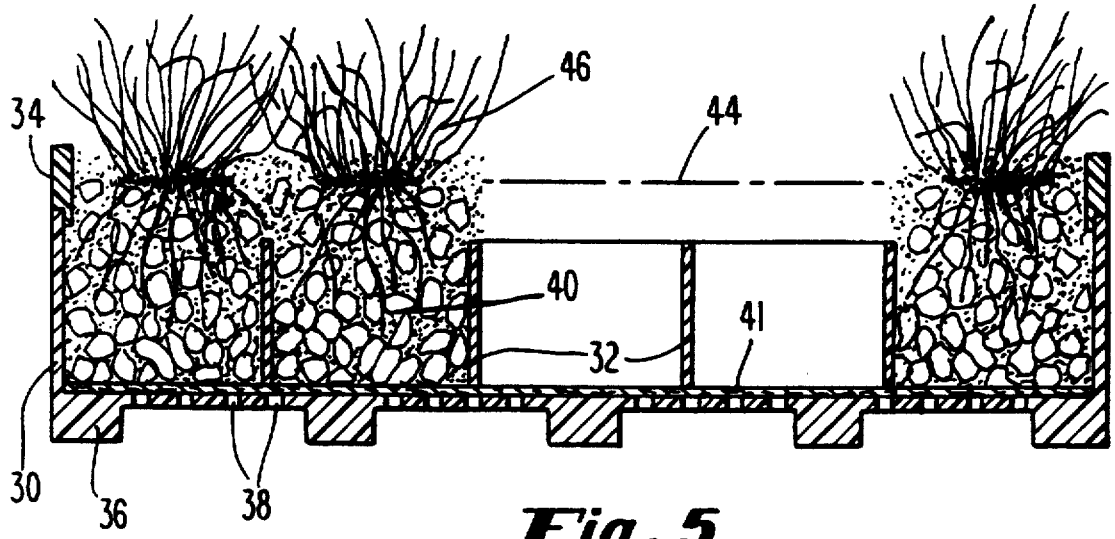
FIG. 5 depicts a crossection of a growing pan showing growing plants in place in a growing medium.

FIG. 5 depicts in crossection a turf unit generally in accordance with FIGS. 3 and 4 in a form convenient for the growth and maintenance of turf in the second stadium location. In addition to the sides, 30 the crown arrangement, 34 the skids 36 and baffles 32, drainage holes 38 are also shown. Additionally, a soil retaining layer, 41 which may be any convenient mesh sheet such as a polyethylene, polypropylene or other mesh is also optionally but preferably provided to retain growing medium within the turf unit while permitting the escape of drainage water and the like.

The turf unit of FIG. 5 is also provided with growing medium or soil 40 which is preferably adapted to be at once, an effective medium for the growth of turf plants and to have a relatively light weight to facilitate transportation. A plurality of turf plants 46 are provided at or adjacent to the soil level 44 extant in the turf unit. As will be noted, the turf plants 46 are substantially entire comprising not only full, leafy growth but also an essentially complete root system. The root system, as can easily be appreciated by a person of skill in the art, will interpenetrate the growing medium forming an integrated mass of growing medium and root structure interleaved among the baffling arrangement of the unit. This entire arrangement, conveniently referred to as turf, is healthy and vigorous due to its nurturing in a growing environment optimized for its development: it is also transportable.

Figure 6:
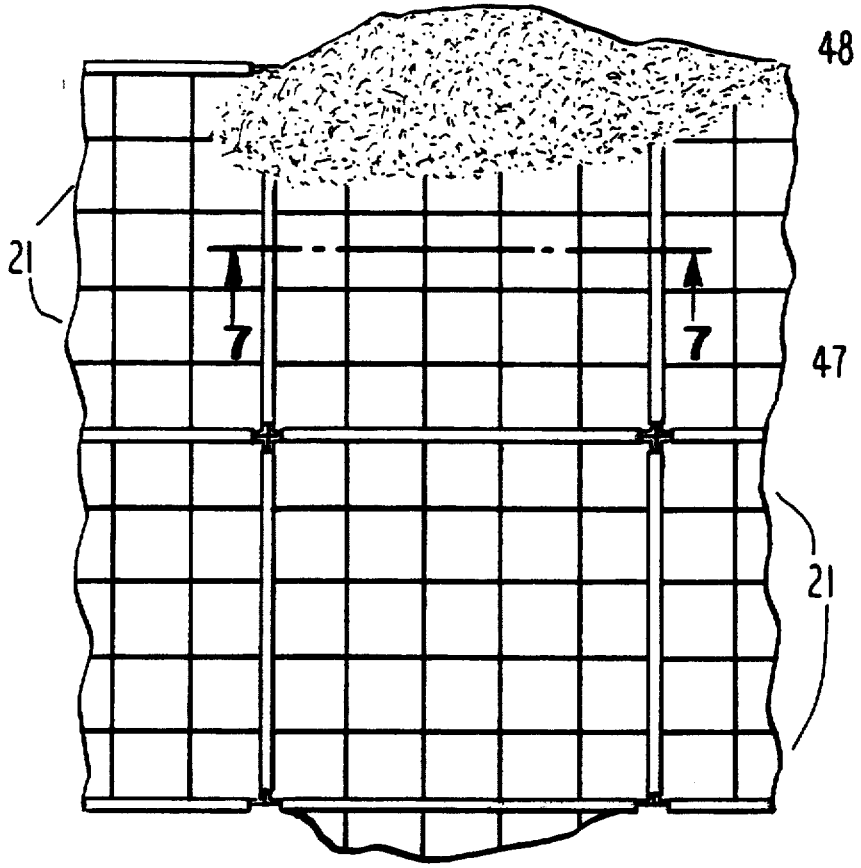
FIG. 6 is a plan view of a plurality of turf units in accordance with the invention fastened together into cooperation to form a uniform playing surface.

FIG. 6 depicts a plurality of turf units, 21 arrayed in a geometric configuration as would be the case when placed in the first location within the domed stadium of FIGS. 1 and 2. The turf units 21 are fastened together with fastening means 47 to form an integrated turf, 48.

Figure 7:
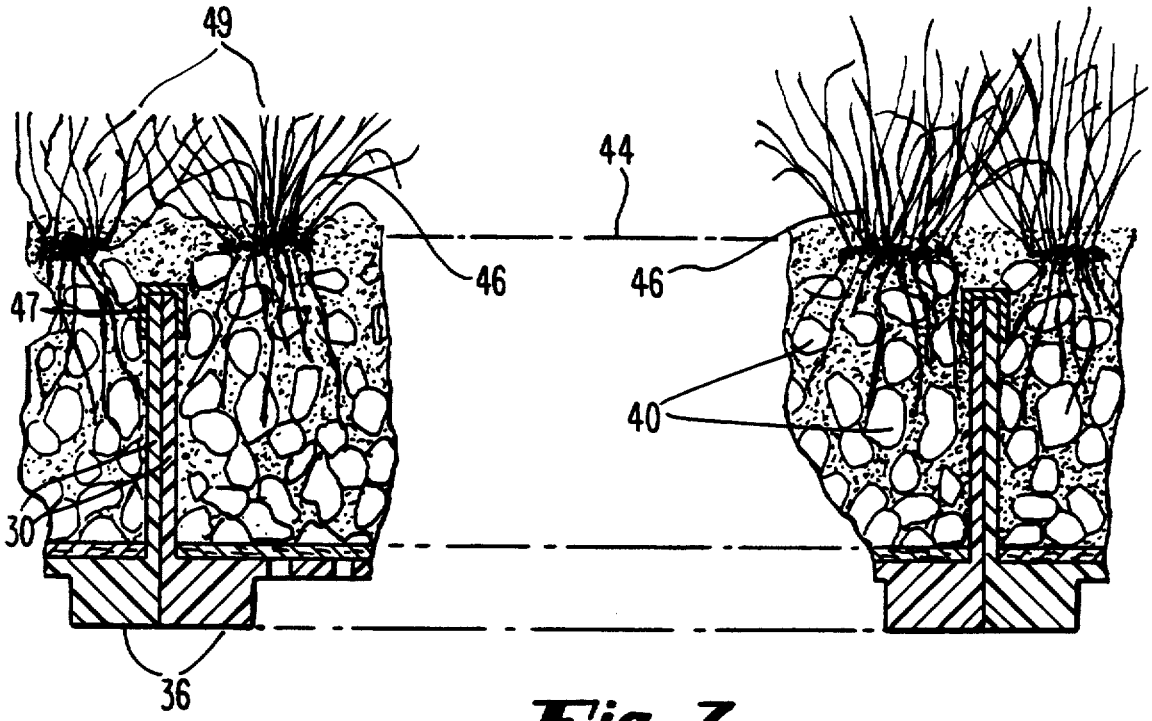
FIG. 7 is a crossection of a playing surface depicting a plurality of turf units fastened together having growing plants, in place.

FIG. 7 is a crossection of the integrated turf depicted in FIG. 6. The crown pieces, 34 depicted in FIGS. 4 and 5 have been removed from each of the turf units, the turf units have been conjoined, and they have been fastened together by fastening means 47. Such fastening means may be any convenient means for attaching pluralities of turf units together such as the depicted clip arrangement. It may also be convenient to fashion the walls, 30 of the turf units so as to cooperate in an interlocking relationship much as childrens' blocks may be fashioned.

The removal of the crown result in the soil level 44 being above the level of the walls 30. The level of the growing plants 46 is, similarly, above the level of the walls. Following fastening of the walls together by fastening means 46, as shown, the portions above the fastened walls may be backfilled with soil mixture, with turf plugs, or the like. Alternatively, since the area is small, in many applications it may simply be ignored.

Following installation and integration of the turf units into an activity surface at the first location of the stadium, the turf shown by mown area, 49, is then prepared for the activities such as by mowing, the application of markings, and the like. Following a particular activity, the turf units may be removed and returned to the second location for continued maintenance and growth. Accordingly, the units are separated from each other and the crown pieces, 34 replaced. Backfilling with additional soil, if needed, is accomplished and the units are transported from the first location back to the second location. It will be appreciated that the turf units need not be oriented, inter se in the same way each time they are assembled at the first location. Thus, turf units may be located on a rotating basis to permit an evening out of the wear patterns on the turf. Additionally, larger quantities of turf units may be maintained than are actually needed to prepare any particular activity surface so to permit the interchange of new units with those having been exposed to heavy use.

It will be appreciated that a wide variety of geometries may be employed in the utilization of the present invention. Thus, while rectilinear turf units have been depicted, other geometries such as hexagons, trapezoids, and the like may be used to good effect. This is particularly the case since most turf-based activities are rectilinear in format. It may be preferred to employ non-rectilinear geometries or non-rectilinear arrangements of rectilinear turf units in connection with such activities to avoid having sidelines and the like coincide with seams in the pattern of turf units. Such arrangements and geometries are well within ordinary skill in the art.

Figure 8:
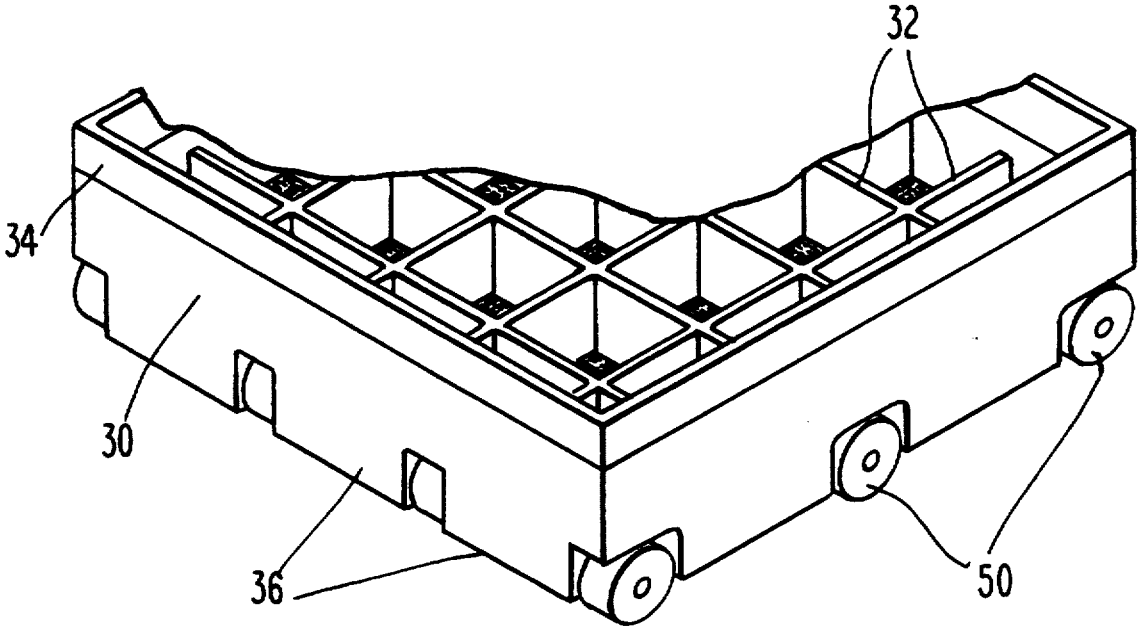
FIG. 8 is a partial respective view of a turf unit in accordance with the invention depicting a wheeled arrangement for transporting the unit.

FIG. 8 depicts a partial perspective view of a turf unit in accordance with the invention. In addition to the sides, 30 crown pieces, 34 and skids 36 there are provided a plurality of wheels or rollers, 50 which are useful in the transportation of the turf units between the first and second locations within the stadium and otherwise. It will be appreciated that a wide variety of transportation means may be employed in order to effect the mobility of the turf units in this way. Thus, in addition to the use of arrangements whereby the turf units are simply slid upon their stretchers, 36 from one location to the other, rollers, 50 railroad-type flanged wheel and rail arrangements, conveyor systems, and a host of other transportation means may be employed. In accordance with other embodiments, the turf units may be treated much as pallets are treated in warehouses. Thus, they may be transported by pallet movers or the like.

In accordance with other preferred embodiments of the invention, the turf units can be used to provide natural turf surfaces in areas remote from their growing location. Thus, turf units in accordance with the invention in any chosen geometry may be transported by rail, by truck, or otherwise and may be established into an activity field on a temporary or long term basis. In this way, renewable turf fields may be constructed in locations where green house facilities are not available. It is thus also possible to construct natural turf fields in indoor or outdoor stadia on a temporary basis when such natural turf fields are required. The natural turf may then be returned to the growing area for reuse in the same or other locations. Throughout, the natural turf is provided in a substantially vigorous, substantially entire state: this is distinct from the use of sod as a temporary measure. Unlike the temporary use of sod on an artificial surface, the provision of a natural turf surface in accordance with this invention provides entire turf plants, growing naturally in a growing medium. The suitability of such natural turf areas to athletic events and the like is far superior to that provided by the temporary use of sod.

The turf units in accordance with the present invention such as the growing pans depicted in FIGS. 3 and 4 may be conveniently formed from many materials. Thus, a wide variety of metals, preserved woods, and plastics may be so employed. It is greatly preferred, however to employ plastics in the formulation of such units. A wide variety of plastics may be so employed although reinforced polyalkylenes, especially fiberglass reinforced polyethylene are preferred. It will be appreciated that such materials may easily be molded, formed and the like, that they may be formulated inexpensively from recycled materials, that they are extremely tough and durable, that they are essentially inert to plant growth chemistry, and that they may be modified easily to accept wheels, clips, and other implementia which may be convenient in the practice of the present invention. Thus, it is preferred to provide integral growing pans to form the turf units of the invention. Such integral pans would comprise, on an integral basis, sides, stretchers, and bottom areas, with drainage holes integrally formed or drilled separately. The removable crown piece is preferably separately molded and designed to fit snugly over or onto the sides of the turf unit. The preferred baffling devices may be similarly prepared from the foregoing materials. Alternatively, the baffles may be molded integrally with the unit itself. The soil retainer 40 of FIG. 5 may be a suitable plastic mesh. Alternatively, the drainage holes of the turf unit may be so designed as to obviate the need for such a component.

In accordance with the present invention, it is preferred to employ plant growing media which are especially formulated to be, at once, excellent media for the growth of turf plants and to have a relatively light weight when compared to natural soils. It will be appreciated that soil for the growth of plants is predominately sand with varying amounts of clay, decomposed organic matter, nutrients, minerals, and other components. Thus, it will be appreciated that turfgrass growing media should have pH in the range of 6.0 to 7.0 and contain primary, secondary and minor nutrients. The medium should have a low to medium salt concentration and be free of contaminants detrimental to turfgrass growth. It is also greatly preferred that the growing medium have excellent drainage. Heretofore, there has been no great desire for turfgrass growing media to have particular light weight characteristics. This is so because the transport of turfgrass has been by way of sod, collections of incomplete plants. It is now desired to transport substantially entire plants complete with growing media and a containment element in the form of a turf unit. Accordingly, there is now a great desire to provide growing medium having all of the desirable properties of ordinary media but also having relatively light weight.

In accordance with this invention, the plant growth media may be comprised of at least two fractions. The first fraction, called the sand fraction, comprises at least about 75% sand. The sand is preferably in the 1–0.25 mm range with the major proportion of the sand being less than about 0.5 mm. The sand fraction further comprises, in accordance with preferred embodiments, from about 10 to about 20% humus, up to about 7% clay, and up to about 5% silt. As will be appreciated by persons skilled in the art, acceptable growing medium may be prepared having no silt, or no clay, an indeed without humus in some cases although balanced mixtures of the foregoing are greatly preferred. In accordance with other preferred embodiments, the sand is present in an amount of about 80 to 90% by weight with humus being present of about 10–15% by weight with about 3–7% clay and about 2–5% silt.

The sand fraction is blended with at least about 30% by volume of shaped pieces of expanded polymer. The expanded polymer is selected to be one which is substantially inert to plant growth chemistry and which is relatively stable over time. Thus, plastics which leak toxic compositions or which degrade toxically over time are to be avoided. It is also preferred that the expanded plastic have a very low specific gravity, that is that it have a very large volume per unit weight. An ideal plastic for this purpose is expanded polystyrene commonly known as "styrofoam". The expanded polymer is present in the form of shaped pieces rather than as a bulky solid. It is preferred that the expanded plastic be in shaped pieces having average dimension larger than about ¼" and preferably in a range of from about ½" to about 2". The particular shape of the expanded polymer is not critical; any convenient shape including broken or deformed shapes may be employed. It will be widely recognized that such expanded polymers are commonly available and are commonly used as packing material for fragile objects. Accordingly, there exists a recyclable waste stream of such expanded polymers which may be tapped for inclusion in the growing media in accordance with this invention. The sand fraction comprises at least about 40% by volume of the total plant growth media in accordance with this invention with the expanded polymer comprising at least about 30% by volume of the media. It is preferred that media be provided having at least about 40% expanded polymer with roughly 50:50 mixtures by volume of sand fraction and expanded polymer being most preferred.

The resulting plant growth media has been found to be excellent media for the growth of turf plants providing all of the properties which are required for such growth. In addition, the weight of the growing mixture is vastly decreased over that of the corresponding material without the expanded polymer. Accordingly, the weight demands on the turf units of the present invention are minimized. Concomitant ease of transportation is provided.

The plant growth media of the present invention may be used for other purposes in addition to the turfing system set forth herein. Thus, they may be employed in any circumstances where plant growth is desired but relatively low weights are preferred. Thus, such medium may be used in roof top gardens in planters and in many other circumstances. Since the expanded polymers used in the growing media of the present invention are easily compressible, these mixtures are preferred for use in constricted containers for all-season exposure. As will be appreciated, freezing water in rigid containers may cause destruction of the containers through expansion of the freezing water. The expanded polymers of the present invention remain preferably deformable even under very cold conditions such that freezing water may deform the polymers rather than the containers containing them.

A wide variety of turfgrass species may be employed in connection with the present invention. Thus, turfgrass species may be selected for the particular growing conditions extant in the areas where the turf is to be grown and maintained. Pluralities of cultivars of the turfgrass species are preferred for conventional reasons. Thus, blends of kentucky-blue grass, perennial ryegrass. fescues, bermuda grasses and bentgrasses may be employed depending upon the particular circumstances of each installation. The selection, seeding, nurturing, and maintenance of these turfgrass species takes place in accordance with the present invention in the normal fashion; both the turf units and the plant growth media provided herein are amenable to conventional growing and nurturing techniques.

What is claimed is:

[1. A transportable, natural turf activity surface comprising a plurality of transportable turf units comprising a growing pan having walls and being adapted for containing plant growing medium together with growing, substantially entire, turf plants;

said turf units having fastening means for removably attaching said plurality together;

the turf plants being maintained at a level above the level of the walls of the turf units to provide a substantially flat, substantially continuous turf surface.]

[2. The transportable natural turf activity surface of claim 1] *A transportable, natural turf activity surface comprising a plurality of transportable turf units comprising a growing pan having walls and being adapted for containing plant growing medium together with growing, substantially entire, turf plants;*

*said turf units having fastening means for removably attaching said plurality together;*

*the turf plants being maintained at a level above the level of the walls of the turf units to provide a substantially flat, substantially continuous turf surface;* wherein the plant growing medium comprises:

a sand fraction having at least about 75% by volume sand;

from about 10 to about 20% volume humus;

up to about 7% clay;

up to about 5% silt;

said sand fraction being blended with at least about 30% by volume of shaped pieces of expanded polymer selected to be substantially inert to plant growth chemistry.

3. The transportable natural activity surface of claim 2, wherein said expanded polymer is foamed polystyrene.

4. [The transportable natural turf activity surface of claim 1] *A transportable, natural turf activity surface comprising a plurality of transportable turf units comprising a growing pan having walls and being adapted for containing plant growing medium together with growing, substantially entire, turf plants;*

*said turf units having fastening means for removably attaching said plurality together;*

*the turf plants being maintained at a level above the level of the walls of the turf units to provide a substantially flat, substantially continuous turf surface;* wherein said fastening means cooperates with the walls of the turf units below the level of the turf plants to effect said attachment.

5. [The transportable natural turf activity surface of claim 1 wherein the growing medium is maintained at a level above the level of the walls of the turf units.]

*6. A transportable, natural turf activity surface comprising:*

*a plurality of transportable turf units comprising a growing pan having side walls and containing plant growing medium together with growing, substantially entire, turf plants;*

*said growing, substantially entire turf plants being maintained at a level above said side walls, said turf units cooperating with said other turf units to provide a substantially flat, substantially continuous turf surface over said plurality of said transportable growing pans;*

*wherein the plant growing medium comprises:*

*at least about 48% sand;*

*about 10 to about 20% humus;*

*up to about 7% clay;*

*up to about 5% silt;* said sand fraction being blended with at least 30% by volume of shaped pieces of expanded polymer selected to be substantially inert to plant growth chemistry.

* * * * *